United States Patent
Lee et al.

(10) Patent No.: US 9,801,001 B2
(45) Date of Patent: Oct. 24, 2017

(54) DISASTER SAFETY SYSTEM USING COMBINED BEACON AND METHOD FOR PROCESSING THEREOF

(71) Applicant: ARAM Solution Co., Ltd., Jeonju (KR)

(72) Inventors: Jun Lee, Jeonju (KR); Chan Gyu Park, Jeonju (KR); Yun Jeong Lee, Jeonju (KR)

(73) Assignee: ARAM SOLUTION CO., LTD., Jeonju-si (KR)

( * ) Notice: Subject to any disclaimer, the term of this patent is extended or adjusted under 35 U.S.C. 154(b) by 0 days.

(21) Appl. No.: 15/219,355

(22) Filed: Jul. 26, 2016

(65) Prior Publication Data

US 2017/0156020 A1   Jun. 1, 2017

(30) Foreign Application Priority Data

Nov. 30, 2015   (KR) .................. 10-2015-0168557

(51) Int. Cl.
    *G08B 1/08*     (2006.01)
    *H04W 4/00*    (2009.01)
    (Continued)

(52) U.S. Cl.
    CPC ............. *H04W 4/005* (2013.01); *G08B 5/22* (2013.01); *G08B 29/188* (2013.01); *G08B 31/00* (2013.01); *H04L 67/12* (2013.01)

(58) Field of Classification Search
    CPC ....... H04W 4/005; G08B 5/22; G08B 29/188; G08B 31/00; H04L 67/12
    See application file for complete search history.

(56) References Cited

U.S. PATENT DOCUMENTS 5,708,195 A  *  1/1998  Kurisu ............... G01M 3/2815
                                                    340/605
5,910,763 A  *  6/1999  Flanagan ............... G08B 21/10
                                                    340/286.02

(Continued)

FOREIGN PATENT DOCUMENTS

KR  10-2014-0014776    2/2014
KR  10-2015-0109988   10/2015

OTHER PUBLICATIONS

KIPO, Office Action of Application No. 10-2015-0168557, dated Nov. 15, 2016.

(Continued)

*Primary Examiner* — Joseph Feild
*Assistant Examiner* — Rufus Point
(74) *Attorney, Agent, or Firm* — Lex IP Meister, PLLC

(57) ABSTRACT

The present invention relates to a disaster safety system using a combined beacon and a method for processing thereof. Various low-power sensors are combined with the combined beacon, which measures various environmental information for an installation place through a wireless communication network. The combined beacon supports, for example, Bluetooth and Bluetooth smart standards. The combined beacon combines sensors required by a user to measure and collect the environmental information for the installation place. The disaster safety system is provided to measure and collect various environmental information for the installation place in real time by using a combined beacon in which a plurality of sensors is combined and provide the environmental information to a smart device of a user and collect, analyze, and monitor the environmental information and predict and determine whether a disaster occurs at the installation place. According to the present invention, since the disaster safety system is able to be constructed by using an application of the smart device, (Continued)

system construction cost can be reduced and various sensors required by the user can be combined to the combined beacon and environmental data of the combined sensor is provided to be used for Internet of things (IoT) application services of various fields.

8 Claims, 8 Drawing Sheets

(51) Int. Cl.
*G08B 31/00* (2006.01)
*H04L 29/08* (2006.01)
*G08B 29/18* (2006.01)
*G08B 5/22* (2006.01)

(56) References Cited

U.S. PATENT DOCUMENTS

| | | | | |
|---|---|---|---|---|
| 7,089,116 B2* | 8/2006 | Smith | .................... | G08B 21/10 702/3 |
| 8,219,110 B1* | 7/2012 | White | .................... | H04W 4/02 340/988 |
| 9,129,532 B2* | 9/2015 | Rubin | .................... | G08G 1/166 |
| 9,171,450 B2* | 10/2015 | Cho | .................... | G08B 25/10 |
| 9,401,178 B2* | 7/2016 | Bentley | ................. | H04N 7/181 |
| 9,548,828 B1* | 1/2017 | Kuznetsov | ............. | H04H 20/59 |
| 9,598,009 B2* | 3/2017 | Christensen | ........... | B60Q 9/008 |
| 2005/0197775 A1* | 9/2005 | Smith | .................... | G08B 21/10 702/3 |
| 2006/0003775 A1* | 1/2006 | Bull | ...................... | G01S 5/0205 455/456.1 |
| 2006/0015254 A1* | 1/2006 | Smith | .................... | H04W 4/02 702/3 |
| 2006/0226970 A1* | 10/2006 | Saga | .................... | G08B 27/001 340/506 |
| 2007/0033153 A1* | 2/2007 | Yamanaka | ............. | G01V 1/008 706/21 |
| 2008/0111705 A1* | 5/2008 | Lee | ...................... | G08B 27/008 340/690 |
| 2009/0303070 A1* | 12/2009 | Zhang | .................... | G08B 21/10 340/690 |
| 2009/0326821 A1* | 12/2009 | Yomoda | ................. | G01V 1/008 702/2 |
| 2011/0310701 A1* | 12/2011 | Schuster | ............... | H04B 13/02 367/38 |
| 2012/0302199 A1* | 11/2012 | Yamashita | .............. | H04W 4/22 455/404.2 |
| 2013/0217332 A1* | 8/2013 | Altman | .................. | H04H 60/90 455/41.2 |
| 2013/0279491 A1* | 10/2013 | Rubin | .................... | G08G 1/166 370/347 |
| 2014/0055272 A1* | 2/2014 | McCormick | ........... | G01W 1/10 340/601 |
| 2014/0253326 A1* | 9/2014 | Cho | ........................ | H04W 4/22 340/539.13 |
| 2015/0195693 A1* | 7/2015 | Hooriani | ................. | H04W 4/22 455/404.2 |
| 2015/0264547 A1* | 9/2015 | Kobayashi | ............. | G06Q 50/26 455/404.2 |
| 2015/0317801 A1* | 11/2015 | Bentley | ................. | H04N 7/181 382/107 |
| 2015/0325102 A1* | 11/2015 | Mondal | .................... | H04L 67/04 340/539.11 |
| 2015/0334545 A1* | 11/2015 | Maier | ................... | H04W 4/005 455/404.2 |
| 2016/0127875 A1* | 5/2016 | Zampini, II | .......... | H04W 4/043 370/311 |
| 2017/0008454 A1* | 1/2017 | Christensen | ........... | B60Q 9/008 |

OTHER PUBLICATIONS

KIPO, Office Action of Application No. 10-2015-0168557, dated May 29, 2017.

* cited by examiner

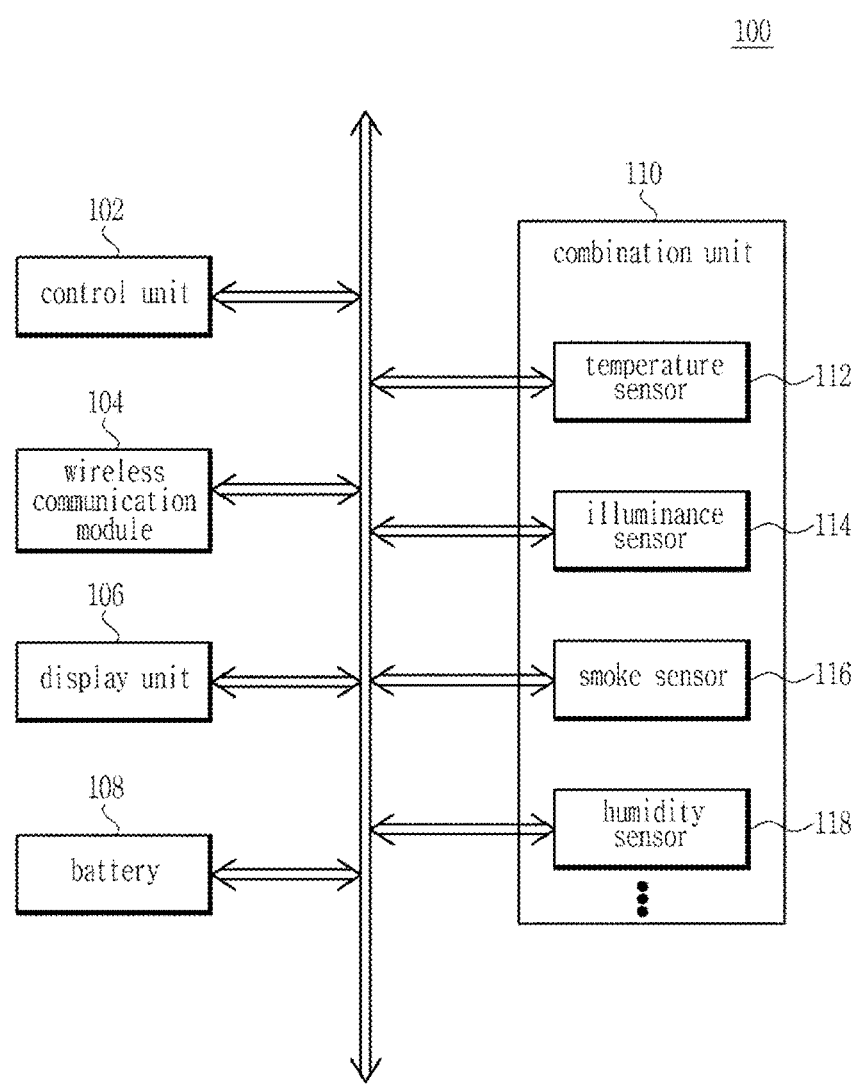

DISASTER SAFETY SYSTEM USING COMBINED BEACON AND METHOD FOR PROCESSING THEREOF

CROSS-REFERENCE TO RELATED APPLICATIONS

This application claims priority from Korean Patent Application No. 10-2015-0168557, filed on Nov. 30, 2015, which is hereby incorporated by reference for all purposes as if fully set forth herein.

BACKGROUND OF THE INVENTION

1. Field of the Invention

The present invention relates to a disaster safety system, and more particularly, to a disaster safety system using a combined beacon and a method for processing thereof which easily install a combined beacon including various sensors regardless of a place, collect various information of an installation place, which is measured through the sensors in a smart device, and monitors whether a disaster occurs at the installation place in real time through the collected information to process a warning announcement to be generated when the disaster occurs.

2. Description of the Related Art

In recent years, demands of urban residents for camping which the urban residents goes for healing in nature have continuously increased and there is a trend that camping experiences of people have also increased. A camping market has increased in scale and been very fashionable, but a safety consciousness is low and in recent years, as camping related accidents frequently have occurred in camping facility, a camping ground, and the like, rampant safety ignorance of our society has been clearly shown in rapid growth.

Further, a regulation or a safety device well matched to the camping market scale is not provided at all, and as a result, a solution is keenly required. In order to solve the problem, various disaster preventing systems or disaster safety systems have been constructed, but a lot of cost for system construction is consumed, and as a result, it is actually impossible to construct various systems and a safety precaution of campers for the disaster is a best method.

Further, in recent years, an area of Internet of things (IoT) called a future food or a core of a trend has extended. In particular, there is a trend that as a smart phone is supplied, personalization of IT is diffused, and as a result, various contents have been released through linkage with various home appliances and various smart devices.

In particular, due to the development of wireless communication technology such as WiFi, and Bluetooth various information can be collected or monitored by using a mobile device and a smart device at various places. For example, in the case of Bluetooth which is one short-range wireless communication, a pairing process is required among devices for using Bluetooth in the related art. The pairing process continuously generates power consumption, and as a result, it is difficult to use the pairing process for a long time in the mobile device having a battery.

However, in recent years, Bluetooth smart, the mobile device or the smart device which supports Bluetooth low energy (BLE) can transmit information among devices without the pairing process and since a period of transmitting data is longer than that in the existing Bluetooth scheme, the power consumption is relatively small. Further, since manufacturing cost of the mobile device is low, it can be used as a Bluetooth beacon providing various information for various purposes.

The Bluetooth beacon can be installed at a desired place and easily accessed through the mobile device or smart device supporting Bluetooth and the Bluetooth beacon can be used in various fields as information on various topics provided from Bluetooth beacons at the installation places.

PRIOR ART DOCUMENT

Patent Document

Korean Patent Registration No. 10-1509195 (firm date: Apr. 7, 2015)

Korean Patent Registration No. 10-1550302 (firm date: Sep. 7, 2015)

Korean Patent Unexamined Publication No. 10-2015-0099354 (firm date: Aug. 31, 2015)

Korean Patent Unexamined Publication No. 10-2015-0093296 (firm date: Aug. 18, 2015)

SUMMARY OF THE INVENTION

An object of the present invention is to provide a disaster safety system and a method for processing thereof which measure a surrounding environmental state at an installation place by using a combined beacon in which various sensors are combined, monitor whether a disaster occurs through measurement data in real time, and transfer an emergency situation to a user through an alarm when the disaster occurs.

Another object of the present invention is to provide a disaster safety system using a combined beacon and a method for processing thereof for achieving a safe camping culture through convergence to Internet of things and a camping culture.

Another object of the present invention is to provide a disaster safety system using a combined beacon, which is easily installed regardless of a place and is low in system construction cost and a method for processing thereof.

Another object of the present invention is to provide a disaster safety system using a combined beacon and a method for processing thereof which remotely control various peripheral devices such as a smart home device, a smart door lock, and a smart bulb in order to maintain an optimal environment in link with a smart device.

Another object of the present invention is to provide a disaster safety system and a method for processing thereof, which analyze various information collected by using a combined beacon, configure the various information as big data, and process for applying the big data even to another service through an open API providing the big data.

In order to achieve the objects, a disaster safety system of the present invention measures and provides various information for installation places by using combined beacons. The disaster safety system of the present invention measures and collects various environmental information for the installation places in real time by using a combined beacon in which a plurality of sensors is combined and provides the various environmental information to a smart device of a user therethrough to monitor whether a disaster occurs at the installation places.

According to an aspect of the present invention, a disaster safety system includes: at least one combined beacon including one or more sensors which are combined among a plurality of sensors measuring various environmental information at installation places and measuring the environmental information from the respective sensors in real time and transmitting the environmental information to a wireless communication network; a smart device including an application, collecting data by receiving the environment information from the combined beacon through the wireless communication network in real time by using the application when the combined beacon is recognized, and analyzing and monitoring the collected data to determine whether a disaster occurs at the installation places and generate an alarm; and a disaster safety management server receiving and collecting data from the smart device through the wireless communication network and generating big data for the environmental information from the collected data.

Preferably, the combined beacon may include a combination unit selectively combining and installing one or more sensors among the sensors according to the need of a user, a wireless communication module transmitting the environmental information measured from one or more sensors installed in the combination unit to the smart device through the wireless communication network, a display unit at least displaying power and operating states of the combined beacon, a battery supplying power of the combined beacon, and a control unit controlling the sensor, the wireless communication module, the display unit, and the battery.

Preferably, the disaster safety system may further include a peripheral device which is installed adjacent to the installation place and connected with the smart device through the wireless communication network, and which the smart device is capable of remotely controlling in response to the environmental information by analyzing and monitoring the collected data.

Preferably, the smart device may include an environmental data automatic collecting unit collecting and storing environmental data by receiving the environmental information from one or more combined beacons by automatically executing the application, a warning alarm unit determining whether a disaster occurs according to a result of analyzing the environmental data and generating a warning alarm when the disaster occurs, a history managing and monitoring unit managing or monitoring a history for the installation place and the combined beacon by transmitting the collected environmental data to the disaster safety management server, a peripheral device control processing unit automatically or manually remotely controlling the peripheral device positioned close to the installation place according to the result analyzed from the environmental data, and an environmental information providing unit providing the environmental information including weather information for the installation place from the collected environmental data.

Preferably, the smart device may be connected with the combined beacon through low-power Bluetooth and when the combined beacon is recognized, the smart device may automatically collect the environmental information.

According to another aspect of the present invention, provided is a method for processing a disaster safety system using a plurality of combined beacons and smart devices.

The method for processing the disaster safety system includes: measuring various environmental information for an installation place from at least one combined beacon including one or more sensors which are combined among a plurality of sensors measuring various environmental information at installation places and measuring the environmental information from the respective sensors in real time and transmitting the environmental information to a wireless communication network; recognizing, by a smart device, the combined beacon and receiving the environmental information measured by the combined beacon through the wireless communication network to collect environmental data; analyzing, by the smart device, the collected environmental data and warning and predicting whether a disaster occurs at an installation place from an analyzed result; and generating an alarm when it is determined that the disaster occurs at the installation place according to a result of the warning and prediction.

Preferably, the method may further include: transmitting, by the smart device, the environmental data to a disaster safety management server through the wireless communication network when collecting the environmental data and collecting, by the disaster safety management server, the environmental data transmitted from the smart device; managing a history of the environmental data in response to the installation place and the combined beacon; and analyzing the collected environmental data and monitoring the analyzed environmental data through an analyzed result in real time to at least generate an alarm to the smart device when it is determined that a disaster situation occurs at the installation place.

Preferably, the method may further include remotely controlling a peripheral device from the smart device when it is determined that the peripheral device positioned adjacent to the installation place and connected with the smart device through the wireless communication network needs to be remotely controlled in response to the environmental data collected from the smart device.

As described above, according to exemplary embodiments of the present invention, a disaster safety system measures and collects various environmental information for installation places in real time by using a combined beacon in which a plurality of sensors is combined and a smart device, provides the measured and collected various environmental information to the smart device of a user therethrough, and processes whether a disaster occurs at an installation place to be monitored, thereby reducing cost for constructing the disaster safety system.

Further, according to exemplary embodiments of the present invention, various sensors required by the user can be combined to the combined beacon and data of the combined sensors is provided, and as a result, the disaster safety system can be used for Internet of things application services of various fields.

In addition, according to exemplary embodiments of the present invention, since the disaster safety system can arbitrarily configure various contents by using the smart device, the disaster safety system can be implemented by using an application of the smart device at the time of upgrading various functions and additional contents.

Besides, according to exemplary embodiments of the present invention, since the disaster safety system collects data by applying the smart device and a beacon technology, it is possible to remove cumbersome in which separate pairing and the application of the smart device need to be executed.

Further, according to exemplary embodiments of the present invention, since the disaster safety system collects data collected by a sensor device in the smart device to immediately announce a warning alarm and can transmit the data to a disaster safety management server by using a wireless communication technology of the smart device, a separate communication device for the data collection need not be used.

BRIEF DESCRIPTION OF THE DRAWINGS

FIG. 3 is a block diagram illustrating the combined beacon illustrated in FIG. 1;

DETAILED DESCRIPTION OF THE EMBODIMENTS

Figure 1:
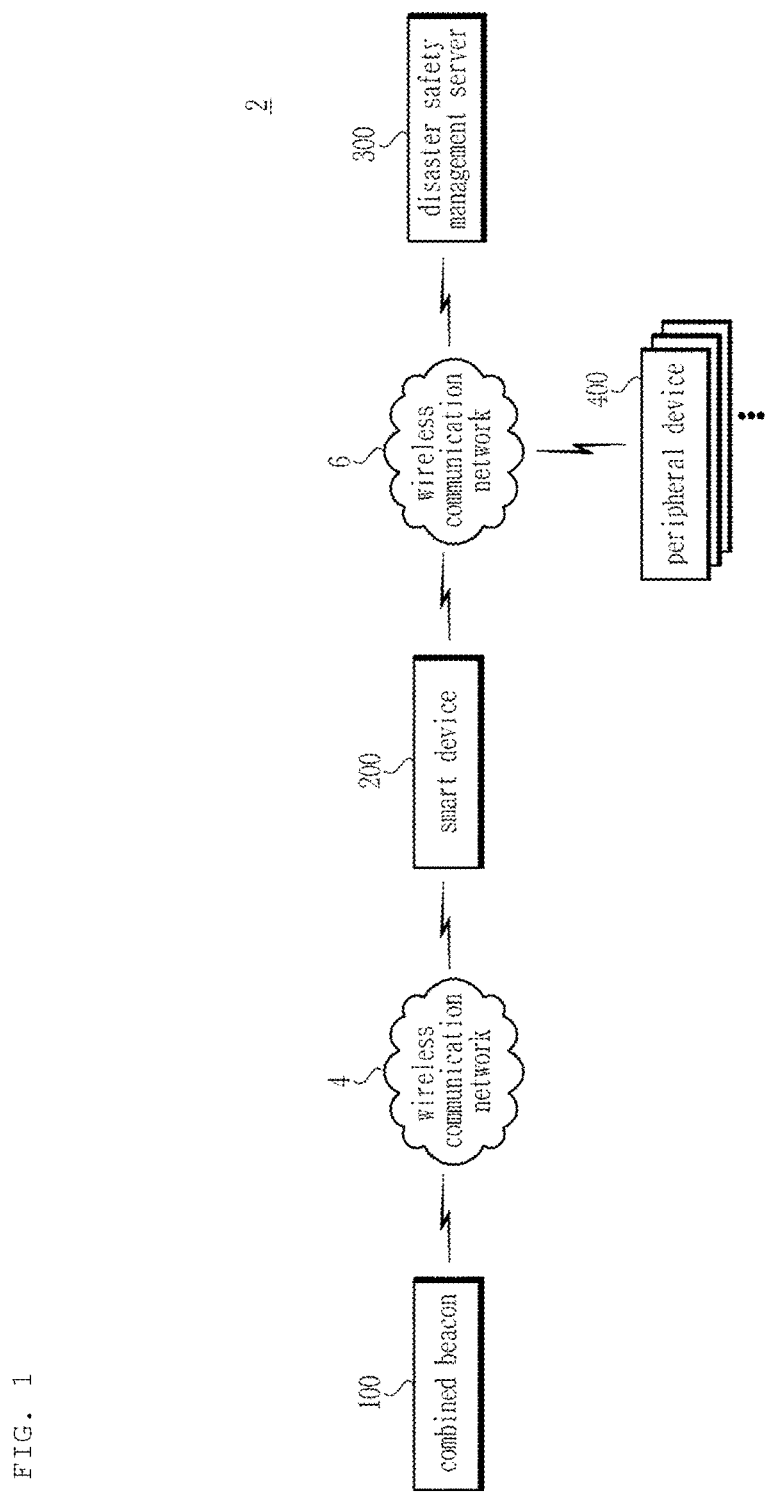
FIG. 1 is a block diagram illustrating a network configuration of a disaster safety system according to the present invention.

The exemplary embodiments of the present invention can be modified in various forms, and it should not be construed that the scope of the present invention is limited to exemplary embodiments described below in detail. The exemplary embodiments are provided to more completely describe the present invention to those skilled in the art. Therefore, shapes of elements in the drawings may be enlarged in order to emphasize a more clear description.

Hereinafter, an exemplary embodiment of the present invention will be described in detail with reference to FIGS. 1 to 7.

Figure 2:
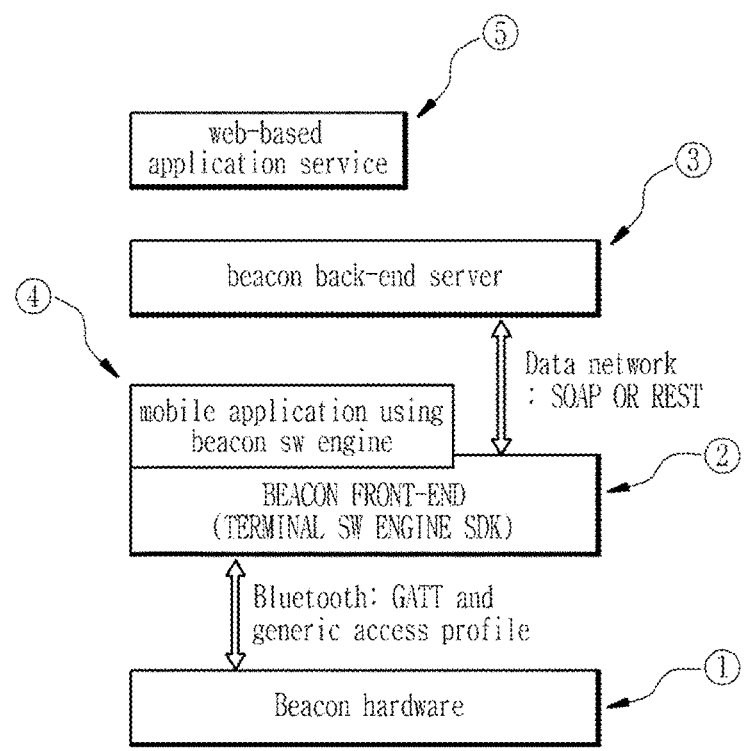
FIG. 2 is a block diagram illustrating a configuration of an environmental data measurement platform using a combined beacon illustrated in FIG. 1.
Figure 4A:
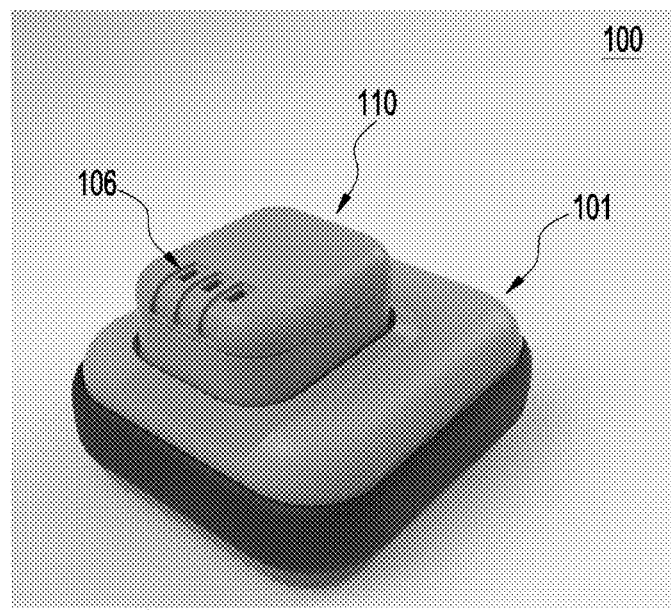
FIGS. 4A to 4C are diagrams illustrating a configuration of the combined beacon illustrated in FIG. 3.
Figure 4B:
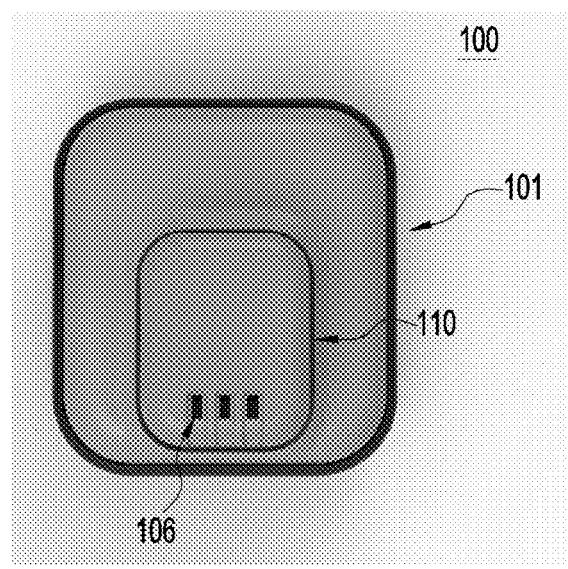
Figure 4C:
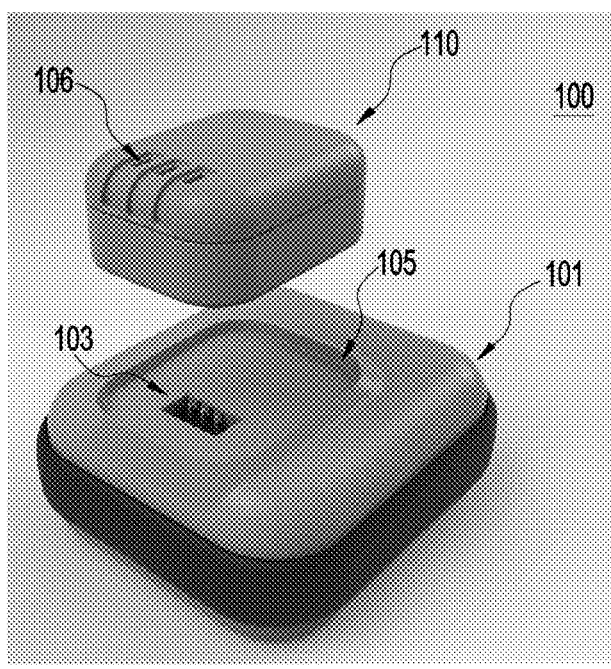
Figure 5:
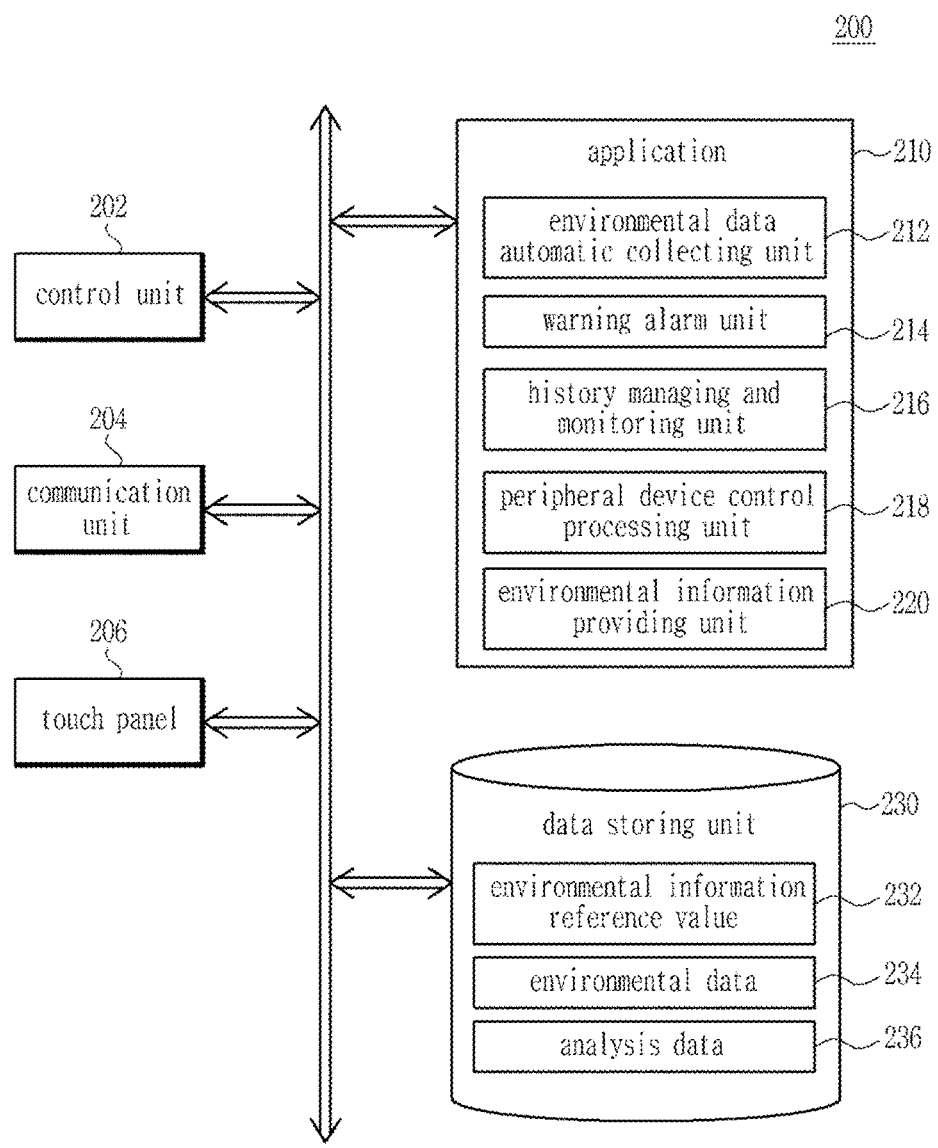
FIG. 5 is a block diagram illustrating a configuration of a smart device illustrated in FIG. 1.
Figure 6:
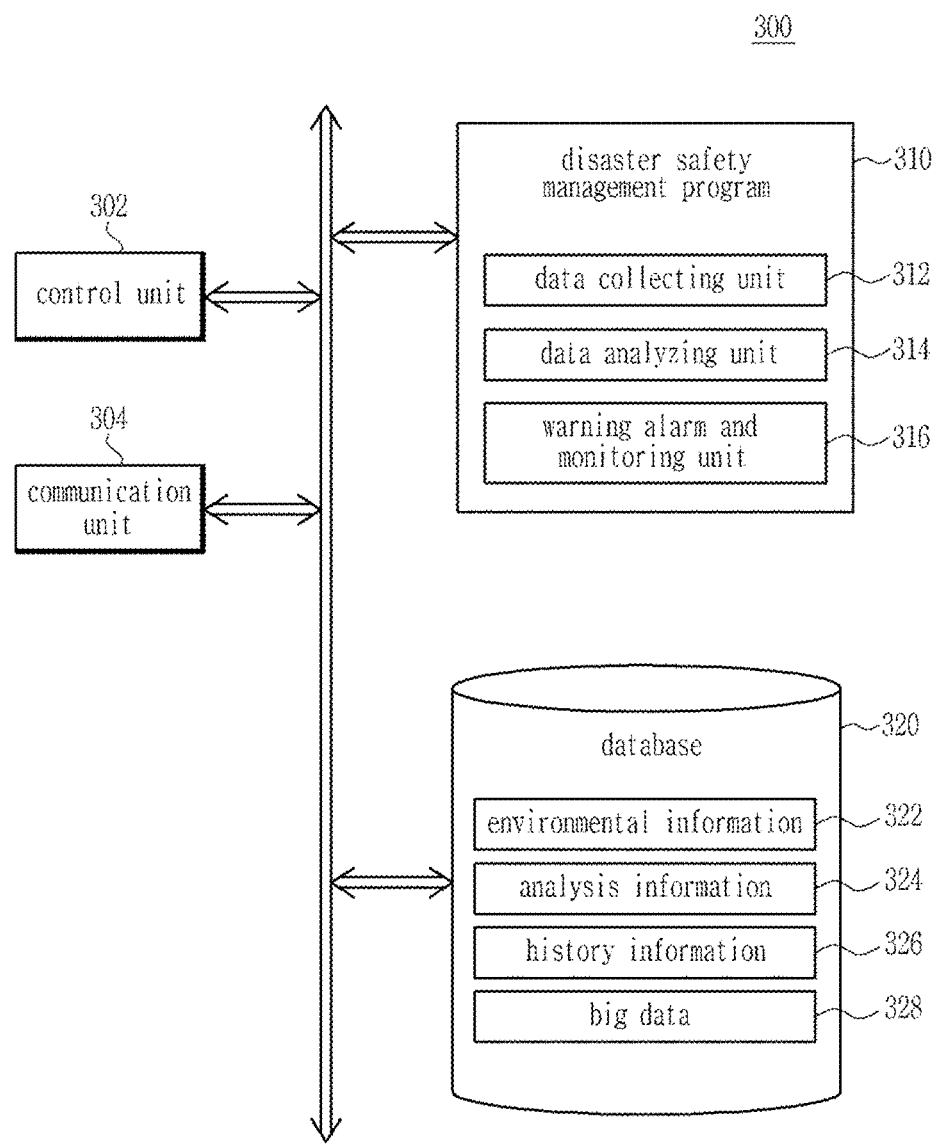
FIG. 6 is a block diagram illustrating a configuration of a disaster safety management server illustrated in FIG. 1.

FIG. 1 is a block diagram illustrating a network configuration of a disaster safety system according to the present invention, FIG. 2 is a block diagram illustrating a configuration of an environmental data measurement platform using a combined beacon illustrated in FIG. 1, FIG. 3 is a block diagram illustrating the combined beacon illustrated in FIG. 1, FIGS. 4A to 4C are diagrams illustrating a configuration of the combined beacon illustrated in FIG. 3, FIG. 5 is a block diagram illustrating a configuration of a smart device illustrated in FIG. 1, and FIG. 6 is a block diagram illustrating a configuration of a disaster safety management server illustrated in FIG. 1.

First, referring to FIG. 1, the disaster safety system 2 of the present invention measures and collects, in real time, various environmental information for an installation place by using a combined beacon 100 in which a plurality of sensors is combined and provides the various environmental information to a smart device 200 of a user therethrough to monitor whether a disaster occurs at the installation place.

The disaster safety system 2 of the present invention configures an environmental data measurement platform using the combined beacon by using an Internet of things (IoT) platform as illustrated in FIG. 2. That is, the environmental data measurement platform of the disaster safety system is constituted by beacon hardware ①, a beacon front-end ②, a beacon mobile application ④, a beacon back-end server ③, and a web-based application service ⑤.

Herein, the beacon hardware ① represents the combined beacon 100 according to the present invention and the beacon front-end ② represents a software development kit (SDK) which is a software engine of a beacon terminal. A generic attribute profile of Bluetooth, that is, GATT and a generic access profile are defined between the beacon hardware ① and the beacon front-end ②. The SDK as the beacon terminal engine may process data by receiving a beacon signal and develop various application programming interfaces (APIs) usable in a mobile application. Further, the SDK as the beacon terminal engine provides various information such as transmission of various sensor data and terminal identification numbers (for example, a serial number) to be easily and conveniently developed in the mobile application.

The beacon back-end server ③ directly communicates with the beacon terminal SDK engine to query or store various application data to a server and use the various application data in application services. A simple object access protocol (SOAP) or a representational state transfer (REST) for collecting information through a data network is provided between the beacon front-end ② and the beacon mobile application ④.

The beacon mobile application ④ as the mobile application using the beacon software engine is an application which allows actual users to access a user experience (UX) and a user interface (UI). In the present invention, the beacon mobile application ④ provides an environment control service through the web-based application service ⑤.

To this end, the disaster safety system 2 of the present invention includes a plurality of combined beacons 100, smart devices 200, and disaster safety management servers 300. Further, the disaster safety system 2 of the present invention may further include a peripheral device 400. In the exemplary embodiment, the combined beacons 100 and the smart device 200 are connected with each other through a wireless communication network 4, for example, a Bluetooth communication network and the smart devices 200, and the disaster safety management servers 300 and the peripheral devices 400 are connected with each other through a wireless communication network 6 such as a mobile communication network, Bluetooth, and WiFi.

In detail, the plurality of combined beacons 100 is installed at the installation place to measure various environmental information for the installation place in real time. The combined beacon 100 transmits the environmental information measured by using the wireless communication network 4, that is, the Bluetooth to the smart device 200.

The combined beacons 100 include a plurality of sensors which measures various information in order to measure environmental information (for example, a temperature, a humidity, illuminance, smoke, a flame, sound, vibration, atmospheric pollution, gas, a motion, and the like) desired by the user, respectively. The combined beacon 200 is provided in a type in which various sensors may be combined according to the need of the user. The combined beacon 100 has a wireless communication range of a predetermined area. Therefore, the combined beacons 100 are installed so that the wireless communication ranges mutually overlap with each other. The plurality of combined beacons 100 are installed at various outdoor places including, for example, a camping ground, an exterior of a building, a zone of a predetermined area, and the like.

The combined beacon 100 is provided as a small beacon to be easily installed and as illustrated in FIGS. 3 to 4C, the combined beacon 100 includes a body 101, a control unit 102 in the body 101, a wireless communication module 104, a display unit 106, a battery 108, and a combination unit 110.

The body 101 has a substantially similar shape as a rectangular parallelepiped and includes a seating groove 105 in which the combination unit 110 is inserted in and seated on the top thereof. The combination unit 110 is inserted into the seating groove 105 and a connector 103 is provided, which is electrically connected with the control unit 102.

The combination unit 110 includes a connector (not illustrated) on the bottom and is provided to be mutually separated from the body 101. The combination unit 110 is mounted on the seating groove 105 of the body 101 to be electrically connected with the control unit 102 through the connector 103. Inn the exemplary embodiment, the combination unit 110 includes a display unit 106 at one side thereof.

The control unit 102 controls an overall operation of the combined beacon 100 to be processed. That is, the control unit 102 controls a plurality of sensors 112 to 118 installed in the wireless communication module 104, the display unit 106, the battery 108 and the combination unit 110. In detail, the control unit 102 controls the sensors 112 to 118 to measure the environmental information in real time and controls various environmental information measured by the sensors 112 to 118 to be transmitted to the smart device 200 through the wireless communication module 104.

The wireless communication module 104 is provided as for example, a Bluetooth module to transmit the environmental information measured by various sensors 112 to 118 installed in the combination unit 110 to the outside through the wireless communication network 4.

The display unit 106 is provided as for example, at least one light emitting diode (LED), a small liquid crystal display (LCD) panel, and the like to display a power state, an operation state, and the like of the combined beacon 100 by being controlled by the control unit 102. The display unit 106 of the exemplary embodiment is provided at one side of the combination unit 110 as a plurality of light emitting diodes. The display unit 106 is lighting-displayed to correspond to the sensors provided in the combination unit 110.

The battery 108 is provided as for example, a primary battery, a rechargeable secondary battery, and the like and is controlled by the control unit 102 to supply driving power of the combined beacon 100.

In addition, a plurality of different sensors which measures various environmental information at the installation places is combined with the inside of the combination unit 110. The combination unit 110 of the exemplary embodiment at least includes a temperature sensor 112, an illuminance sensor 114, a smoke sensor 116, and a humidity sensor 118. Of course, the combination unit 110 is provided to be combined according to the need of the user among sensors for measuring various environmental information for the installation places, such as a fire sensor, a sound sensor, a vibration sensor, an atmospheric pollution sensor, a gas sensor, and a motion sensor. Therefore, the combined beacon 100 may be used to construct various Internet of things associated systems and since the combined beacon 100 is implemented by using low-power Bluetooth and Bluetooth smart, power consumption may be minimized by using a low-power circuit design and a low-power component.

The smart device 200 as a mobile terminal of the user positioned at the installation place, for example, such as a smart phone, and a tablet terminal, collects and stores the environmental data by receiving various environmental information from the combined beacon 100 through the wireless communication network 4 by using the application 210. The smart device 200 may collect various environmental information from the combined beacon 100 not through pairing.

Further, the smart device 200 analyzes various environmental information by using the collected and stored environmental data, determines whether the disaster occurs according to an analysis result, and generates an alarm when it is determined that the disaster occurs. Further, the smart device 200 transmits the collected environmental data to the disaster safety management server 300 to manage or monitor a history for the installation place. In addition, the smart device 200 remotely automatically or manually controls the peripheral devices 400 at locations close to the installation place through the collected environmental data.

The smart device 200 of the exemplary embodiment includes a control unit 202, a communication unit 204, a touch panel 206, a memory (not illustrated) in which the application 210 is installed, and a data storing unit 230, as illustrated in FIG. 5.

The control unit 202 controls an overall operation of the smart device 200 to be processed. That is, the control unit controls the communication unit 204, the touch panel 206, the memory in which the application 210 is installed, and the data storing unit 230. Detailed contents for the control unit 202 and the application 210 will be described below in detail in FIG. 7.

The communication unit 204 is connected to the wireless communication networks 4 and 6 by being controlled by the control unit 202 to process mutual data communication with the combined beacon and the disaster safety management server.

The touch panel 206 may set various reference values for determining whether the disaster occurs from the respective environmental data through a user interface of the application 210 or inputs various information for determining whether the disaster occurs through the application. Further, the touch panel 206 displays the collected environmental data and the analysis result from environmental data to be monitored. Further, when the alarm is generated, the touch panel 206 displays a history in which the alarm is generated. In addition, the touch panel 206 displays various peripheral devices 400 provided approximate to the installation place to be remotely controlled in response to the analysis result or inputs control information so as to manually remotely control various peripheral devices 400.

The application downloaded from the disaster safety management server 100 is installed in the memory. The application 210 is constituted by an environmental data automatic collecting unit 212 collecting and storing the environmental data by receiving various environmental information from at least one combined beacon 100 by being automatically executed, a warning alarm unit 214 determining whether the disaster occurs according to the analysis result of the environmental data and generating a warning alarm when the disaster occurs, a history managing and monitoring unit 216 transmitting the collected environmental data to the disaster safety management server 100 to manage or monitor a history regarding the installation place, the combined beacon, and the like, a peripheral device control processing unit 218 automatically or manually controlling various peripheral devices positioned close to the installation place according to the result analyzed from the environmental data, and an environmental information providing unit 220 providing the environmental information for the installation place, for example, a weather such as a temperature or a humidity and other environmental information such as an atmospheric pollution level and a noise level from the collected environmental data.

In addition, the data storing unit 230 is provided as for example, the memory, a memory card, and the like and stores an environmental information reference value 232 including various predetermined reference values for determining whether the disaster occurs from the respective environmental data, environmental data 234 collected and stored from the combined beacon, and analysis data 236 in which a result of comparing and the analyzing the environmental information reference value and the environmental data is stored so as to determine whether the disaster occurs.

Herein, environmental information reference value 232 may be automatically or manually set through the application 210.

The disaster safety management server 300 collects the environmental data transmitted from the smart device 200 through the wireless communication network 6 by using the disaster safety management program 310 and generates the environmental information from the collected environmental data and stores the generated environmental information in the database 320. The disaster safety management server 300 analyzes the environmental information stored in the database 320 and monitors the analyzed environmental information in real time to predict a disaster occurrence situation or generates the warning alarm to the smart device 200 and a periphery (for example, a disaster safety management guard, a manager, and the like) when the disaster occurs. Further, the disaster safety management server 300 generates big data for the environmental information at the installation place by using the environmental information, analysis information, and history information and stores the generated big data in the database 320.

The disaster safety management server 300 of the exemplary embodiment includes a control unit 302, a communication unit 304, a storage unit (not illustrated) in which the disaster safety management program 310 is stored, and a database 320 as illustrated in FIG. 6. Further, although not illustrated, the disaster safety management server 300 includes components of a typical computer system, for example, a central processing device, a memory device, an input/output device, a storage device, and the like.

In detail, the control unit 302 controls an overall operation of the disaster safety management server 300 to be processed by using the disaster safety management program 310. That is, the control unit 302 controls the communication unit 304, the storage unit (not illustrated), and the database 320. In addition, although not illustrated, the control unit 102 may include software such as an operating system program and a control program as well as hardware such as the central processing device, the memory or a web server.

The control unit 302 collects the environmental data transmitted from the smart device 200 through the wireless communication network 6 by using the disaster safety management program 310, generates and analyzes the environmental information from the collected environmental data and processes the environmental information to be monitored in real time, predicts the disaster occurrence situation or controls the warning alarm to be generated to the smart device 200 and the periphery when the disaster occurs, and generates the big data for the environmental information at the installation place by using the environmental information, the analysis information, and the history information. The generated big data may be used in services of various fields, for example, a social infrastructure remote management service, and the like such as sightseeing, home automation, health care, a smart energy related field, an intelligent traffic service, a building, a road, a railroad, and a bridge as well as the camping ground. Detailed processing contents for the control unit 302 and the disaster safety management program 310 will be described in detail in FIG. 7.

The communication unit 304 is controlled by the control unit 302 and connected with the smart devices 200 and the disaster safety management servers 300 through the wireless communication networks 4 and 6 to process the smart devices 200 and the disaster safety management servers 300 to perform data communication with each other.

The disaster safety management program 310 includes a data collecting unit 312 automatically collecting the environmental data transmitted from the smart device 200 through the wireless communication network 6, a data analyzing unit 314 analyzing the collected environmental data and generating the big data through the environmental data and the analyzed data, and a warning alarm and monitoring unit 316 processing the environmental data at the installation place to be monitored in real time, predicting the disaster occurrence situation according to the analysis result, or generating the warning alarm to the smart device 200 and the periphery when it is determined that the disaster occurs.

In addition, the database 320 is controlled by the control unit 302 to store various information depending on a processing procedure of the disaster safety management program 110. In the exemplary embodiment, the database 320 is provided in the disaster safety management server 300, but may be provided as a separate database server.

The database 120 of the exemplary embodiment stores environmental information 322 including the environmental data for the installation place, the identification number of the combined beacon, and the location from the collected environmental data, analysis information 324 including the result of analyzing the environmental data, history information 326 including the installation places, the combined beacons, and whether the disaster occurs therefor, and big data 328 generated through the environmental data, the analysis data, and the history information.

In addition, the peripheral device 400 as various devise positioned close to the combined beacon 100, such as a smart home device, a smart door lock, and a smart bulb may be remotely controlled by the smart device 200 through the wireless communication network 6. When the peripheral device 400 is automatically or manually remotely controlled from the smart device 200, the peripheral device 400 operates in response thereto.

As described above, the disaster safety system 2 of the present invention measures the environmental information from the combined beacons 100 devised by combining sensors required by the user among various sensors measuring various environmental information at the installation places and the smart device 200 thus collects, analyzes, and monitors the environmental information in real time to predict and determine whether the disaster occurs at the installation places. In addition, the disaster safety system 2 of the present invention collects, analyzes, and monitors the environmental information through the disaster safety management server 300 and generates the big data to provide the environmental information and the big data to be used in the services of various fields. Further, the disaster safety system 2 of the present invention may remotely control the peripheral device 400 in response to the environmental information at the installation place through the smart device 200.

Figure 7:
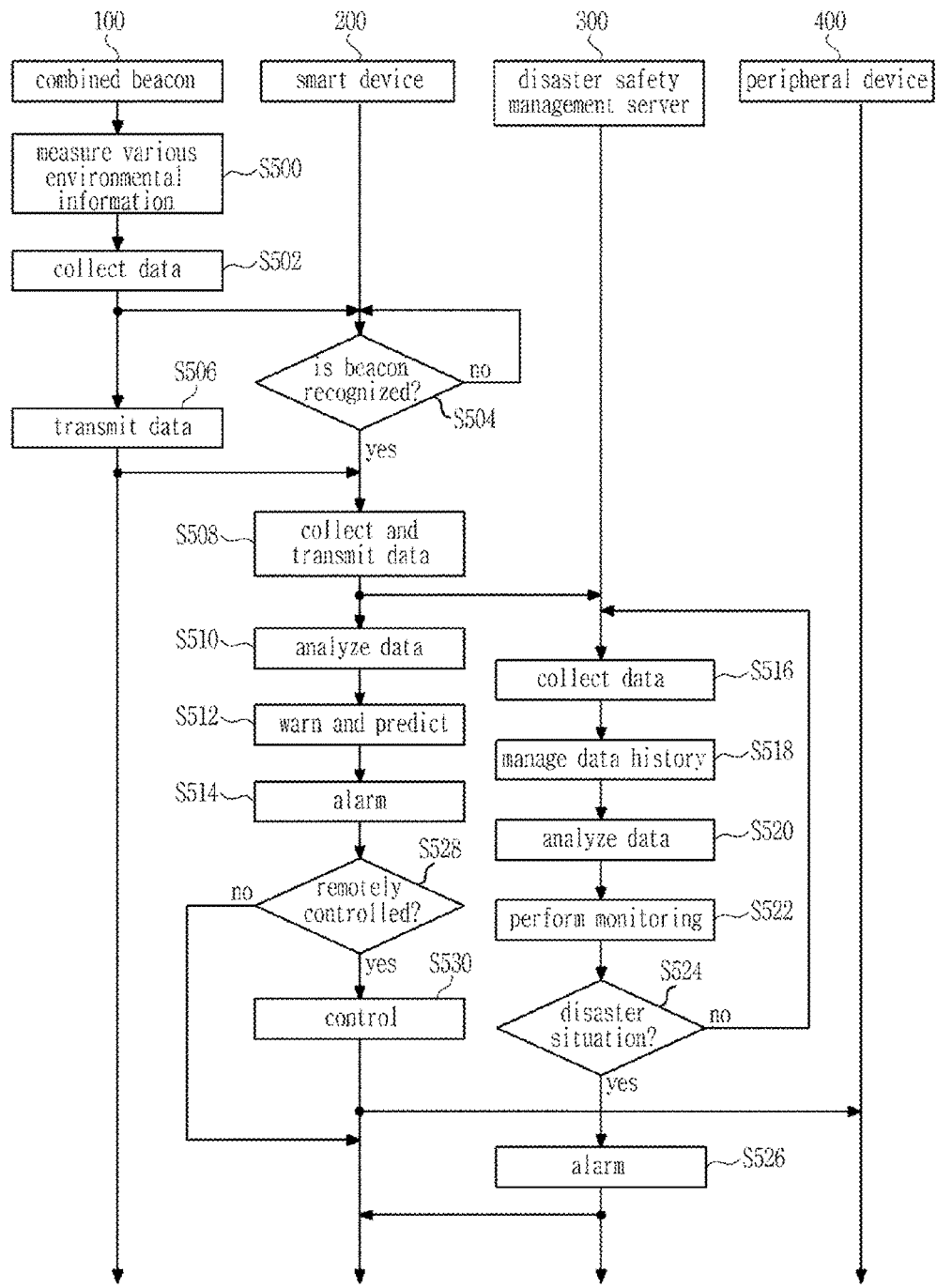
FIG. 7 is a flowchart illustrating a processing sequence of a disaster safety system according to the present invention.

In addition, FIG. 7 is a flowchart illustrating a processing sequence of a disaster safety system according to the present invention. This procedure is a program for linking the combined beacon 100, the smart device 200, the disaster safety management server 300, and the peripheral devices 400 and the application 210 and the disaster safety management program 310 are linked with each other.

Referring to FIG. 7, the disaster safety system 2 of the present invention measure various environmental information at the installation places from the combined beacon 100 in step S500 and collects the data measured in step S502. In this case, a plurality of sensors is combined to the combined beacon 100 in response to the environmental information required by the user.

In step S504, the smart device 200 recognizes the combined beacon 100, and when the combined beacon 100 transmits the measured and collected environmental information in step S506, the smart device 200 automatically receives and collects and stores the environmental information and transmits the environmental information to the disaster safety management server 300 in step S508.

In step S510, the smart device 200 analyzes the collected environmental data and warns and predicts whether the disaster occurs at the installation place from a result analyzed in step S512, and generates an alarm when it is determined that the disaster occurs in step S514.

In step S516, the disaster safety management server 300 collects the environmental data transmitted from the smart device 200 and in step S518, the disaster safety management server 300 manages a history of data in response to the installation place and the combined beacon. In step S520, the collected data is analyzed and the collected data is monitored through a result analyzed in step S522 in real time. When it is determined that the disaster situation occurs while monitoring in step S524, the alarm is generated to the smart device 200 and the periphery in step S526. When the disaster safety management server 300 determines that a current case is not the disaster situation, steps S516 to S524 are repeatedly processed.

In this case, when the alarm is generated, the smart device 200 determines whether remotely controlling the periphery device 400 is required in step S528. As a result of the determination, when remotely controlling the peripheral device 400 depending on the generation of the alarm is required, the control information is transmitted to the peripheral device 400 to be remotely controlled. In the exemplary embodiment, various peripheral devices 400 are remotely controlled through the smart device 200 and the Bluetooth communication. As another example, the smart device 200 may remotely control various peripheral devices 400 through the combined beacon 100.

Hereinabove, although the configuration and the action of the disaster safety system using the combined beacon according to the present invention have been illustrated according to the detailed description and the drawings, this is just described by using the exemplary embodiment and various changes and modifications can be made without a scope without departing from the technical spirit of the present invention.

What is claimed is:

1. A disaster safety system comprising:
at least one combined beacon including at least one sensor which are combined among a plurality of sensors measuring various environmental information at installation places and measuring the environmental information from the respective sensors in real time and transmitting the environmental information to a wireless communication network;
a smart device including an application, collecting data by receiving the environment information from the combined beacon through the wireless communication network in real time by using the application when the combined beacon is recognized, and analyzing and monitoring the collected data to determine whether a disaster occurs at the installation places and generate an alarm; and
a disaster safety management server receiving and collecting data from the smart device through the wireless communication network and generating big data for the environmental information from the collected data.

2. The disaster safety system of claim 1, wherein:
the combined beacon includes
a combination unit selectively combining and installing at least one sensor among the sensors according to the need of a user,
a wireless communication module transmitting the environmental information measured from at least one sensor installed in the combination unit to the smart device through the wireless communication network,
a display unit at least displaying power and operating states of the combined beacon,
a battery supplying power of the combined beacon, and
a control unit controlling the sensor, the wireless communication module, the display unit, and the battery.

3. The disaster safety system of claim 2, further comprising:
a peripheral device which is installed adjacent to the installation place and connected with the smart device through the wireless communication network, and which is capable of remotely controlling by the smart device in response to the environmental information by analyzing and monitoring the collected data.

4. The disaster safety system of claim 3, wherein:
the smart device includes
an environmental data automatic collecting unit collecting and storing environmental data by receiving the environmental information from at least one combined beacon by automatically executing the application,
a warning alarm unit determining whether a disaster occurs according to a result of analyzing the environmental data and generating a warning alarm when the disaster occurs,
a history managing and monitoring unit managing or monitoring a history for the installation place and the combined beacon by transmitting the collected environmental data to the disaster safety management server,
a peripheral device control processing unit automatically or manually remotely controlling the peripheral device positioned close to the installation place according to the result analyzed from the environmental data, and
an environmental information providing unit providing the environmental information including weather information for the installation place from the collected environmental data.

5. The disaster safety system of claim 4, wherein the smart device is connected with the combined beacon through low-power Bluetooth and when the combined beacon is recognized, the smart device automatically collects the environmental information.

6. A method for processing a disaster safety system, the method comprising:
measuring various environmental information for an installation place from at least one combined beacon including at least one sensor which are combined among a plurality of sensors measuring various environmental information on installation places and measuring the environmental information from the respective sensors in real time and transmitting the environmental information to a wireless communication network;
recognizing, by a smart device, the combined beacon and receiving the environmental information measured by the combined beacon through the wireless communication network to collect environmental data;

analyzing, by the smart device, the collected environmental data and warning and predicting whether a disaster occurs at an installation place from an analyzed result; and generating an alarm when it is determined that the disaster occurs at the installation place according to a result of the warning and prediction.

7. The method of claim 6, the method further comprising:

transmitting, by the smart device, the environmental data to a disaster safety management server through the wireless communication network when collecting the environmental data and collecting, by the disaster safety management server, the environmental data transmitted from the smart device;

managing a history of the environmental data in response to the installation place and the combined beacon; and analyzing the collected environmental data and monitoring the analyzed environmental data through an analyzed result in real time to at least generate an alarm to the smart device when it is determined that a disaster situation occurs at the installation place.

8. The method of claim 7, the method further comprising:

remotely controlling a peripheral device by the smart device when it is determined that the peripheral device positioned adjacent to the installation place and connected with the smart device through the wireless communication network needs to be remotely controlled in response to the environmental data collected from the smart device.

* * * * *